April 15, 1969  B. SPURLOCK  3,438,888

CATALYST PRETREATMENT PROCESS

Filed July 10, 1967

INVENTOR
*BURWELL SPURLOCK*
BY
ATTORNEYS

United States Patent Office 3,438,888
Patented Apr. 15, 1969

3,438,888
CATALYST PRETREATMENT PROCESS
Burwell Spurlock, Lafayette, Calif., assignor to Chevron Research Company, San Francisco, Calif., a corporation of Delaware
Filed July 10, 1967, Ser. No. 652,093
Int. Cl. C10g 35/08; B01j 11/16
U.S. Cl. 208—138         4 Claims

ABSTRACT OF THE DISCLOSURE

A catalyst containing platinum and rhenium on a porous solid carrier is contacted with a highly aromatic feedstock and hydrogen at reforming conditions for at least 0.5 hour prior to reforming a naphtha with the catalyst.

BACKGROUND OF THE INVENTION

Field

This invention relates to hydrocarbon reforming processes and more particularly to a method of startup of a reforming process conducted in the presence of a catalyst comprising platinum and rhenium associated with a porous solid catalyst carrier.

Prior art

Catalysts comprising catalytically active amounts of platinum and rhenium supported on porous solid catalyst carriers, e.g., alumina, have been found to be highly valuable for the reforming of naphthas. The platinum-rhenium catalyst exhibits exceptional stability and selectivity for the production of high octane gasoline when reforming sulfur-free naphthas. However, the catalyst generally causes excessive hydrocracking when initially contacted with initially contacted with hydrogen and a sulfur-free naphtha at reforming conditions, thereby producing excessive yields of light hydrocarbon gases, for example, methane and ethane. Furthermore, a temperature excursion or heat front, which could lead to a temperature runaway in a commercial reforming operation, is observed in the catalyst bed when the naphtha is initially contacted with the platinum-rhenium catalyst. Nevertheless, after the initial period the platinum-rhenium catalyst is so superior to a catalyst comprising platinum without rhenium that the initial poor reforming, which results in the production of light gases and the temperature excursion, can be tolerated, if necessary, for the time needed to reduce the excess hydrocracking activity of the catalyst.

It has been found that the initial high yields of light hydrocarbon gases and/or the accompanying temperature excursion can be avoided, minimized, or substantially diminished by careful start-up and/or pretreatment procedures. Although the production of light gases and the temperature excursion are related phenomena, i.e., a change in one generally results in a change in the other, it is possible to substantially eliminate the temperature excursion without eliminating the high gas production. Thus, while it is desirable to eliminate both the high gas production and the temperature excursion, a start-up and/or pretreatment procedure which eliminates one, e.g. the temperature excursion, is still highly desirable.

SUMMARY OF THE INVENTION

It has been found that the high hydrocracking activity of the platinum-rhenium catalyst can be reduced and more particularly that the high temperature excursion can be substantially eliminated by starting up a reforming process in accordance with the present invention. Thus, the present invention involves a start-up procedure for a reforming process wherein naphtha is contacted in the presence of hydrogen and at reforming conditions with a catalyst comprising catalytically active amounts of platinum and rhenium associated with a porous solid catalyst carrier. The present process can also be considered as a catalyst pretreatment process. The start-up and/or pretreatment procedure comprises preconditioning said catalyst prior to said reforming operation by exposing said catalyst for a period of at least about 0.5 hour to contact with a highly aromatic hydrocarbon stock at reforming conditions. Preferably the aromatic hydrocarbon stock contains at least 50 volume percent aromatics and more preferably 70 volume percent aromatics. Furthermore, the catalyst is preferably reduced, i.e. the platinum and rhenium are preferably converted to the metallic state, prior to contact with the highly aromatic hydrocarbon stock.

DESCRIPTION OF THE DRAWING

The present invention may be better understood and will be further explained hereinafter with reference to the graphs in the figures. The graphs in FIGURES 1 and 2 show for comparison purposes a reforming process started up in the presence of a small amount of sulfur (curve 1) and a reforming process started up in accordance with the present invention (curve 2). The graph in FIGURE 1 shows the average catalyst temperatures required to maintain a 100 (F–1 clear) octane product as a function of a length of test or hours on-stream for each of the reforming processes. The graph in FIGURE 2 shows a function of time on-stream the yield of $C_5+$ liquid product or gasoline having a 100 octane (F–1 clear) rating produced during each of the reforming processes. The sulfur start-up was used for comparison purposes since sulfur start-ups are generally considered conventional for reforming processes, and particularly for reforming processes using platinum catalysts. See, for example, U.S. Patents 3,224,-962 and 2,863,825.

DESCRIPTION OF THE INVENTION

Figure 1:
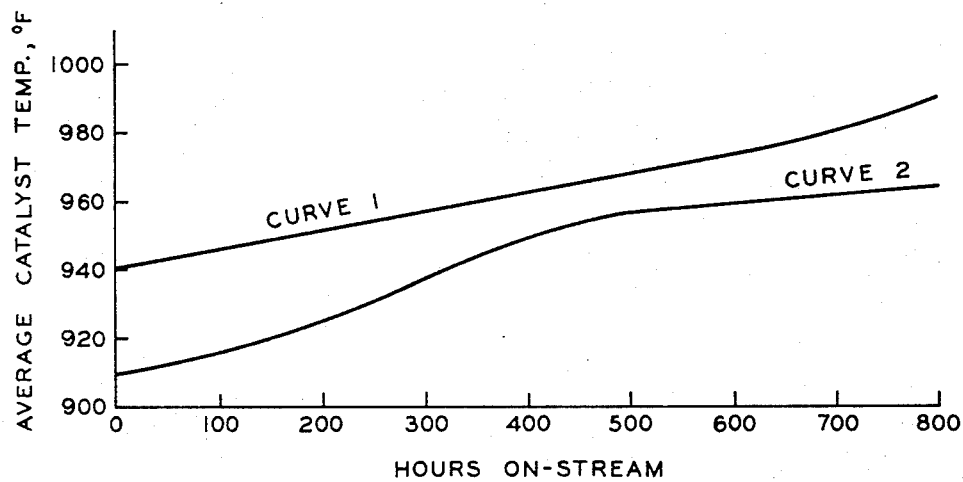

The catalyst involved in the reforming start-up process of the present invention comprises a porous solid catalyst support having disposed thereon in intimate admixture catalytically active amounts of platinum and rhenium. More specifically the catalyst preferably comprises platinum in an amount from about 0.01 to 3 weight percent, and more preferably about 0.2 to 1 weight percent, based on the finished catalyst. Concentrations of platinum below 0.01 weight percent are too low for satisfactory reforming operations, while, on the other hand, concentrations of platinum above about 3 weight percent are generally unsatisfactory because they produce excessive cracking. Furthermore, due to the high cost of platinum, the amount which can be used is somewhat restricted. The concentration of rhenium in the final catalyst composition is preferably from 0.01 to 5 weight percent and more preferably from 0.1 to 2 weight percent. Higher concentrations of rhenium could be advantageously used, but the cost of rhenium limits the amount incorporated on the catalyst. It is preferred that the rhenium to platinum atom ratio be from about 0.2 to about 2.0. More preferably, it is preferred that the atom ratio of rhenium to platinum does not exceed one. Higher ratios (i.e., greater than one) of rhenium to platinum can be used but generally no further significant improvement is obtained.

The porous solid catalyst carrier or support which is employed in the preparation of the platinum-rhenium catalyst of the present invention can include a large number of materials upon which the catalytically active amounts of platinum and rhenium can be disposed. The porous solid carrier can be, for example, silicon carbide, charcoal, or carbon. Preferably, the porous solid carrier is an inorganic oxide. A high surface area inorganic oxide carrier is particularly preferred, e.g., an inorganic oxide having a surface area of 50–700 m.²/gm. and more preferably 150–700 m.²/gm. The carrier can be a natural or a synthetically produced inorganic oxide or combination of inorganic oxides. Typical acidic inorganic oxide supports which can be used are the naturally occurring aluminum silicates, particularly when acid treated to increase the activity, and the synthetically-produced cracking supports, such as silica-alumina, silica-zirconia, silica-alumna-zirconia, silica-magnesia, silica-alumina-magnesia, and crystalline zeolitic aluminosilicates. Generally, however, reforming processes are preferably conducted in the presence of catalysts having low cracking activity, i.e., catalysts of limited acidity. Hence, preferred carriers are inorganic oxides such as magnesia and alumina.

A particularly preferred catalytic carrier for purposes of this invention is alumina. Any of the forms of alumina suitable as a support for reforming catalysts can be used. Furthermore, alumina can be prepared by a variety of methods satisfactory for the purposes of this invention. The preparation of alumina for use in reforming catalysts is well known in the prior art.

Although platinum and rhenium can be associated with the porous solid carrier by suitable techniques such as by ion-exchange, coprecipitation, etc., the metals are usually associated with the porous solid carrier by impregnation. Furthermore, one of the metals can be associated with the carrier by one procedure, e.g., ion-exchange, and the other metal associated with the carrier by another procedure, e.g., impregnation. As indicated, however, the metals are preferably associated with the carrier by impregnation. The catalyst can be prepared either by coimpregnation of the two metals or by sequential impregnation. In general, the carrier material is impregnated with an aqueous solution of a decomposable compound of the metal in sufficient concentration to provide the desired quantity of metal in the finished catalyst; the resulting mixture is then heated to remove water. Chloroplatinic acid is generally the preferred source of platinum. Other feasible platinum-containing compounds, e.g., ammonium chloroplatinates and polyammineplatinum salts, can also be used. Rhenium compounds suitable for incorporation onto the carrier include, among others, perrhenic acid and amonium perrhenates.

It is contemplated in the present invention that incorporation of the metals with the carrier can be accomplished at any particular stage of the catalyst preparation. For example, if the metals are to be incorporated onto an alumina support, the incorporation may take place while the alumina is in the sol or gel form followed by precipitation of the alumina. Alternatively, a previously prepared alumina carrier can be impregnated with a water solution of the metal compounds. However, regardless of the method of preparation of the supported platinum-rhenium catalyst it is desired that the platinum and rhenium be in intimate admixture with each other on the support and furthermore that the platinum and rhenium be intimately dispersed throughout the porous solid catalyst support.

Following incorporation of the carrier material with platinum and rhenium, the resulting composite is usually dried by heating at a temperature of, for example, no greater than about 500° F. and preferably at about 200° F. to 400° F. Thereafter the composite can be calcined at an elevated temperature, e.g., up to about 1200° F., if desired.

Prior to the start-up process of the present invention, the carrier containing platinum and rhenium is preferably heated at an elevated temperature in a reducing atmosphere to reduce the platinum and rhenium. The metals are preferably reduced to the metallic state. It is preferred that the heating be performed in the presence of hydrogen, and more preferably, dry hydrogen. In particular, it is preferred that this pre-reduction be accomplished at a temperature in the range of 600° F. to 1300° F., and preferably 600° F. to 1000° F.

The catalyst can be promoted for reforming by the addition of halides, particularly fluoride or chloride. The halides apparently provide a limited amount of acidity to the catalyst which is beneficial to most reforming operations. A catalyst promoted with halide preferably contains from 0.1 to 3 weight percent total halide content. The halides can be incorporated onto the catalyst carrier at any suitable stage of catalyst manufacture, e.g. prior to or following incorporation of the platinum and rhenium. Some halide is often incorporated onto the carrier when impregnating with the platinum; for example, impregnation with chloroplatinic acid normally results in chloride addition to the carrier. Additional halide may be incorporated onto the support simultaneously with incorporation of the metal if so desired. In general, the halides are combined with the catalyst carrier by contacting suitable compounds such as hydrogen fluoride, ammonium fluoride, hydrogen chloride, or ammonium chloride, either in the gaseous form or in a water soluble form, with the carrier. Preferably, the fluoride or chloride is incorporated onto the carrier from an aqueous solution containing the halide.

The naphtha to be employed in the reforming operation is a light hydrocarbon oil. Generally, the naphtha will boil in the range from about 70° F. to 500° F. and preferably from 150° F. to 450° F. The feedstock can be, for example, either a straight-run naphtha or a catalytically cracked naphtha or blends thereof. The feed is preferably essentially sulfur-free, i.e. the feed preferably contains less than about 10 p.p.m. sulfur and more preferably, less than 1 p.p.m. and still more preferably, less than 1.0 p.p.m.

In the case of a feedstock which is not already low in sulfur, acceptable levels can be reached by hydrogenating the feedstock in a presaturation zone where the naphtha is contacted with a hydrogenation catalyst which is resistant to sulfur poisoning. A suitable catalyst for this hydrodesulfurization process is, for example, an alumina-containing support and a minor proportion of molybdenum oxide and cobalt oxide. Hydrodesulfurization is ordinarily conducted at 700–850° F., at 200 to 2000 p.s.i.g., and at a liquid hourly space velocity of 1 to 5. The sulfur contained in the naphtha is converted to hydrogen sulfide which can be removed prior to reforming by suitable conventional processes.

The reforming conditions for converting naphtha to high-octane gasoline depend in large measure on the feed used, whether highly aromatic, paraffinic or naphthenic, and upon the desired octane rating of the product. The temperature in the reforming operation will generally be within the range of about 600° to 1100° F. and preferably about 700° to 1050° F. The pressure in the reforming reaction zone can be subatmospheric, atmospheric, or superatmospheric; however, the pressure will in general lie within the range from about 25 to 1000 p.s.i.g. and preferably from 50 to 750 p.s.i.g. The temperature and pressure can be correlated with the liquid hourly space velocity (LHSV) to favor any particularly desirable reforming reaction as, for example, aromatization, isomerization, or dehydrogenation. In general, the liquid hourly space velocity will be from 0.1 to 10 and preferably from 1 to 5. The hydrogen to hydrocarbon mole ratio is preferably from about 0.5 to 20. The hydrogen can be in admixture with light gaseous hydrocarbons. These reforming conditions are also suitable for the start-up and/or pretreatment process of the present invention.

Reforming generally results in the production of hydrogen; thus, excess hydrogen need not necessarily be added to the reforming process, however, it is usually preferred to introduce excess hydrogen at some stage of the operation as, for example, during startup. The hydrogen can be introduced into the feed prior to contact with the catalyst or it can be contacted simultaneously with the introduction of feed to the reaction zone. Generally, hydrogen is recirculated over the catalyst prior to contact of the feed with the catalyst.

As indicated above, contacting the supported platinum-rhenium catalyst with naphtha at reforming conditions and in the presence of hydrogen initially produces an excessive amount of light hydrocarbon gases and produces a severe temperature excursion unless proper pretreatment and/or start-up techniques are utilized. The production of light hydrocarbon gases and the temperature excursion occur as a result of the high initial hydrocracking activity of the supported platinum-rhenium catalyst. One method suggested in the prior art for diminishing the hydrocracking activity of a platinum catalyst without rhenium is to sulfide the catalyst prior to contact with the naphtha. The procedure can be done in situ or ex situ by passing a sulfur-containing gas, for example, $H_2S$, through the catalyst bed. Other presulfiding techniques are known in the art. Another method suggested in the prior art for reducing the initial hydrocracking activity of a platinum catalyst without rhenium comprises starting up the reforming process in the presence of a small amount of sulfur, for example $H_2S$, or dimethyldisulfide. The exact form of the sulfur used in the sulfiding process is not critical. The sulfur can be introduced into the reaction zone in any convenient manner or at any convenient location.

The conventional start-up procedures using sulfur are not satisfactory when using a catalyst comprising platinum and rhenium supported on a porous solid catalyst carrier. The supported platinum-rhenium catalyst is generally highly sensitive to the presence of sulfur; thus contacting the catalyst with sulfur, e.g., by presulfiding the catalyst prior to contact with naphtha or sulfiding the catalyst during contact with naphtha, results in a decrease in the selectivity and particularly the stability of the catalyst.

The present invention solves the problem of a temperature excursion or heat front which normally is observed in the catalyst bed during the initial contact of the naphtha feed with the supported platinum-rhenium catalyst. Although the temperature excursion only exists during the initial period of contact with the naphtha feed, such an excursion could be the cause of a temperature runaway in a commercial reforming plant. The method of the present invention, i.e., preconditioning the catalyst prior to reforming of a naphtha at reforming conditions by exposing said catalyst for a period of at least about 0.5 hour to contact with a highly aromatic hydrocarbon feedstock under reforming conditions, substantially diminishes the temperature excursion. Furthermore, the preconditioning procedure of the present invention results in an increase in the activity of the catalyst, e.g., as high as 20° to 30° F., when compared to a start-up or pretreatment process using sulfur to sulfide the catalyst. Still further, the present start-up process results in a decreased fouling rate for the subsequent reforming process when compared to a reforming process started up by sulfiding the catalyst.

The present process can be used not only as a start-up procedure but can also be used as a pretreatment procedure; that is, the catalyst can be pretreated, e.g., immediately after preparation of the catalyst, by contact with a highly aromatic hydrocarbon stock at reforming conditions for at least a period of 0.5 hour and then stored until desired for use in a reforming process using naphtha. Naphtha may then be contacted with the pretreated catalyst at reforming conditions without the danger of a temperature runaway during the initial period of reforming, i.e., during startup.

The highly aromatic hydrocarbon stock for preconditioning the supported platinum-rhenium catalyst preferably contains 50 volume percent aromatics and more preferably, 70 volume percent aromatics. Thus, the products of a reforming process, for example, reformate, can be used as the highly aromatic, feedstock for preconditioning the catalyst. Typical reformates will generally have an aromatic content of from 50 to 90 volume percent. The paraffin content of a reformate will generally fall within the range from 10 to 25 volume percent and the naphthene content from 0 to 5 volume percent. Hydrocarbon feedstocks, for example, naphthas, useful for reforming are in general not highly aromatic; naphthas generally have aromatic contents of from 5 to 25 volume percent. The paraffin content of naphthas generally range from 30 to 50 volume percent and the naphthene content from 30 to 60 volume percent. Thus, the benefit of the present invention cannot be realized by starting up the reforming process using a typical naphtha. Rather highly aromatic feedstocks must be used, that is, aromatic feedstocks containing greater than 50 volume percent aromatics and more preferably, greater than 70 volume percent aromatics. Highly aromatic feedstocks which contain a high concentration of polycyclic aromatics are preferred for purposes of the present invention. Thus, feedstocks containing naphthalenes and other cyclic aromatics are desirable.

The highly aromatic hydrocarbon stock used to precondition the supported platinum-rhenium catalyst is passed in contact with the catalyst for a period of at least 0.5 hour, more preferably, 1 hour or most preferably, 2 hours. The contact with the aromatic stock is conducted at reforming conditions and in the presence of hydrogen. Reforming conditions suitable for the purposes of preconditioning the catalyst include temperatures of from 600° to 1100° F., more preferably, 700° to 1050° F.; pressures from 25 to 1000 p.s.i.g., and more preferably 50 to 750 p.s.i.g.; liquid hourly space velocities from 0.1 to 10 and more preferably, 1 to 5; and hydrogen to hydrocarbon mole ratios of from 0.5 to 20. In general, it is desirable to introduce the highly aromatic hydrocarbon stock to the reaction zone and in contact with the supported platinum-rhenium catalyst at low temperatures and pressures, e.g., below about 700° F. and below about 200 p.s.i.g. The pressure and temperature can then be increased to the desired level for reforming upon introduction of the naphtha to be reformed. The preconditioning can also be conducted at the same conditions as will be used upon introduction of the naphtha to the reaction zone.

The present invention can be utilized with freshly prepared supported platinum-rhenium catalysts or with regenerated or rejuvenated supported platinum-rhenium catalysts.

The following example will more fully explain the present invention.

EXAMPLE

A catalyst comprising platinum and rhenium supported on alumina was prepared by impregnation. The finished catalyst composition contained about 0.6 weight percent platinum and about 0.5 weight percent rhenium.

The supported platinum-rhenium catalyst was preconditioned at a pressure of 500 p.s.i.g. by passing a 100 F-1 clear reformate over the catalyst at a liquid hourly space velocity greater than 2 and a hydrogen to hydrocarbon ratio of 3.7. The paraffin/naphthene/aromatic volume percent ratio of the 100 F-1 clear reformate was 25/1/74. Thus, the reformate contained greater than 70 volume percent aromatics. The catalyst was preconditioned at reforming conditions with the highly aromatic hydrocarbon feedstock for a period of about 4 hours. Thereafter the flow of the highly aromatic hydrocarbon stock to the reforming zone was discontinued and naphtha introduced at reforming conditions. The naphtha was a hydrofined, catalytically cracked naphtha having an initial boiling point of 151° F., an end point of 420° F. and a 50 percent boiling point of 307° F. The research octane number of the naphtha without antiknock additives (F-1 clear) was 64.6. The naphtha contained less than 0.1 p.p.m. nitrogen and less than 0.1 p.p.m. sulfur. The reforming conditions were essentially the same as those used for the startup, i.e., a pressure of 500 p.s.i.g., a liquid hourly space velocity (LHSV) greater than 2, and a hydrogen to hydrocarbon mole ratio of 3.7. The hydrogen to hydrocarbon ratio was increased to 5.3 after approximately 200 hours on-stream operation.

No temperature excursion was observed using the start-up process of the present invention. Generally, when a naphtha is introduced to a catalytic reaction zone containing a supported platinum-rhenium catalyst at reforming conditions without a careful startup to reduce the hydrocracking activity of the catalyst, a temperature excursion or heat front travels through the catalyst bed. The temperature in the bed may increase as high as several hundred degrees above the temperature of the naphtha introduced to the reaction zone. Such severe temperature increases can damage the reactor and/or catalyst. The start-up procedure of the present invention eliminates or substantially reduces this heat front.

For comparison purposes a reforming process using a catalyst comprising 0.6 weight percent platinum and 0.6 weight percent rhenium supported on alumina was started up in the presence of sulfur. That is, a hydrofined, catalytically cracked naphtha as described above was contacted directly with a presulfided catalyst, the catalyst having been presulfided in situ by circulating $H_2S$ through the catalyst bed at an elevated temperature prior to introduction of the naphtha. Greater than 3 atomic ratio of sulfur to platinum plus rhenium was used to sulfide the catalyst. The conditions used for reforming were 500 p.s.i.g., and LHSV greater than 2 and a hydrogen to hydrocarbon mole ratio of 3.7; the hydrogen to hydrocarbon mole ratio increased to 5.3 after approximately 200 hours. The space velocity (LHSV) for the process using the startup of the present invention was the same as that for the process using the sulfur startup. The temperatures required to maintain a 100 F-1 clear octane product for the processes using the different start-up procedures are shown in graphs in FIGURE 1 as a function of the on-stream period of operation. Curve 2 is for the reforming process using the startup of the present invention. Curve 1 is for the reforming process using a startup involving the addition of sulfur to the reaction zone. It is seen that the temperature required to maintain a 100 F-1 clear octane product is significantly lower for the process using the startup of the present invention than for the reforming process using a conventional sulfur startup. Thus, an initial activity increase of about 30 degrees is observed for the reforming process using the startup of the present invention as compared to the conventional sulfur startup. Furthermore, the performance of the reforming process over the 800 hours on-stream period using the present inventive startup is significantly better than the performance of reforming process using a conventional startup involving sulfur. Hence, after approximately 500 hours the fouling rate of the process started up in accordance with the present invention (curve 2) is significantly lower than the fouling rate of the process started up using sulfur (curve 1).

Figure 2:
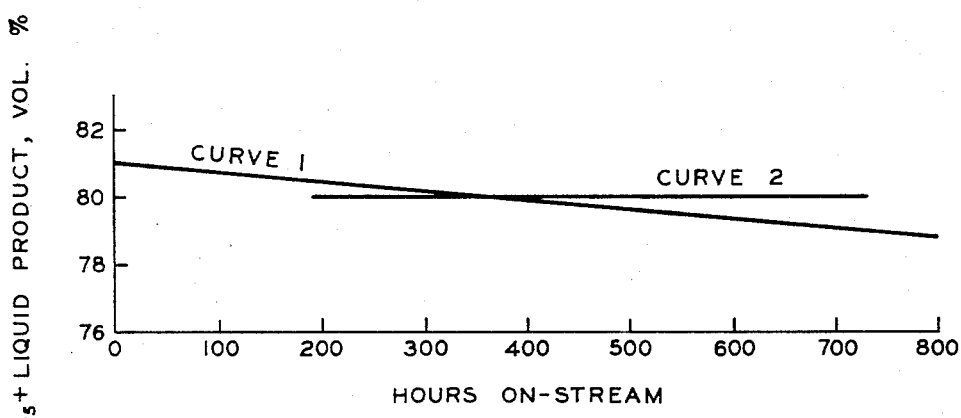

The curves in FIGURES 2 show the $C_5+$ liquid product yield, determined as volume percent, obtained as a function of on-stream time. Curve 2 is for the reforming process using the start-up process of the present invention. Curve 1 is for the process using the conventional sulfur startup. It is noticed that the reforming process using the startup of the present invention shows an improved yield stability over the reforming process using the sulfur startup. Thus, the $C_5+$ liquid yield of the reforming process using the conventional startup (curve 1) decreases about 2 volume percent over 800 hours. On the other hand the $C_5+$ liquid yield for the reforming process using the present inventive startup (curve 2) decreases insignificantly throughout the run length.

The foregoing disclosure of the invention is not to be considered limiting since many variations can be made by those skilled in the art without departing from the scope or spirit of the appended claims.

I claim:

1. In a method for reforming a naphtha having less than 25 volume percent aromatics in the presence of hydrogen at reforming conditions using a catalyst comprising catalytically active amounts of platinum and rhenium associated with a porous solid carrier to obtain a gasoline having an improved octane rating, the improvement which comprises preconditioning said catalyst prior to said reforming operation by exposing said catalyst for a period of at least about 0.5 hour to contact with a highly aromatic hydrocarbon stock having more than 50 volume percent aromatics under reforming conditions.

2. The process of claim 1 wherein said naphtha is substantially sulfur-free.

3. In a reforming process wherein a naphtha fraction having less than 25 volume percent aromatics is contacted at reforming conditons and in the presence of hydrogen with a catalyst comprising 0.01 to 3 weight percent platinum on alumina and promoted with from 0.01 to 5 weight percent rhenium, to produce a gasoline product of improved octane rating, the improvement for reducing the temperature excursion during startup which comprises contacting said promoted catalyst at reforming conditions and in the presence of hydrogen with an aromatic hydrocarbon stock comprising at least 70 volume percent aromatics for at least 0.5 hour prior to contacting said promoted catalyst with said naphtha.

4. The method of reducing the temperature excursion during startup of a reforming catalyst comprising 0.01 to 3 weight percent platinum on a porous inorganic oxide and promoted with from 0.01 to 5 weight percent rhenium which comprises treating said catalyst, prior to reforming a naphtha having less than 25 volume percent aromatics, for a period of at least 0.5 hour to contact with a highly aromatic hydrocarbon stock having more than 50 volume percent aromatics at reforming conditions.

References Cited

UNITED STATES PATENTS

| | | | |
|---|---|---|---|
| 2,885,351 | 5/1959 | Johnston | 208—138 |
| 2,971,902 | 2/1961 | Blome et al. | 208—141 |
| 2,985,581 | 5/1961 | Alliston et al. | 208—138 |
| 3,024,187 | 3/1962 | Johnston et al. | 208—138 |
| 3,167,495 | 1/1965 | Ramella | 208—141 |

HERBERT LEVINE, *Primary Examiner.*

U.S. Cl. X.R.

208—139, 141